`US007062281B2`

United States Patent
Blink et al.

(10) Patent No.: US 7,062,281 B2
(45) Date of Patent: *Jun. 13, 2006

(54) MULTI-MODE PAGING SYSTEM

(75) Inventors: Russell P. Blink, Plano, TX (US); Kenneth J. Lovegreen, Lake Kiowa, TX (US)

(73) Assignee: Long Range Systems, Inc., Dallas, TX (US)

( * ) Notice: Subject to any disclaimer, the term of this patent is extended or adjusted under 35 U.S.C. 154(b) by 443 days.

This patent is subject to a terminal disclaimer.

(21) Appl. No.: 10/173,482

(22) Filed: Jun. 17, 2002

(65) Prior Publication Data

US 2002/0193126 A1 Dec. 19, 2002

Related U.S. Application Data

(63) Continuation-in-part of application No. 09/451,368, filed on Nov. 27, 1999.

(51) Int. Cl.
*H04Q 7/20* (2006.01)
*B60R 25/10* (2006.01)

(52) U.S. Cl. .................. 455/458; 455/41.2; 455/456.3; 455/567; 455/466; 455/515; 340/426.21; 340/426.2; 340/7.2; 340/7.21; 340/7.27

(58) Field of Classification Search ................ 455/458, 455/426.1, 515, 466, 567, 41.2, 456.3; 340/426.2, 340/426.21, 7.2, 7.21, 7.27, 7.52
See application file for complete search history.

(56) References Cited

U.S. PATENT DOCUMENTS

| | | | | |
|---|---|---|---|---|
| 4,910,511 A * | 3/1990 | Nagata et al. | ............. | 340/7.39 |
| 5,047,763 A * | 9/1991 | Kuznicki et al. | .......... | 340/7.29 |
| 5,070,329 A * | 12/1991 | Jasinaki | ..................... | 340/7.27 |
| 5,148,473 A * | 9/1992 | Freeland et al. | ......... | 455/556.1 |
| 5,355,126 A * | 10/1994 | Nelson et al. | ............. | 340/7.25 |
| 5,402,467 A * | 3/1995 | Watanabe | ................ | 455/412.2 |
| 5,432,839 A * | 7/1995 | DeLuca | ..................... | 340/7.21 |
| 5,533,097 A * | 7/1996 | Crane et al. | ............. | 455/552.1 |
| 5,539,392 A * | 7/1996 | Hays et al. | ................ | 340/7.25 |
| 5,777,560 A * | 7/1998 | Sakai et al. | ................ | 340/7.27 |
| 5,907,795 A * | 5/1999 | Hwang | ...................... | 340/7.33 |
| 5,950,128 A * | 9/1999 | Ghisler | ..................... | 455/426.1 |
| 5,963,846 A * | 10/1999 | Kurby | ........................ | 455/12.1 |
| 6,011,953 A * | 1/2000 | Foladare et al. | ........... | 340/7.52 |
| 6,353,739 B1 * | 3/2002 | Davis | ......................... | 455/428 |
| 6,505,046 B1 * | 1/2003 | Baker | ....................... | 455/456.3 |
| 6,678,215 B1 * | 1/2004 | Treyz et al. | .................. | 368/10 |
| 6,701,145 B1 * | 3/2004 | Payne et al. | ................. | 455/417 |
| 2001/0020892 A1 * | 9/2001 | Helferich | ..................... | 340/7.3 |
| 2002/0065087 A1 * | 5/2002 | Ishikawa et al. | ............ | 455/458 |

* cited by examiner

*Primary Examiner*—Sonny Trinh
*Assistant Examiner*—Huy Phan
(74) *Attorney, Agent, or Firm*—Steven W. Smith (57) ABSTRACT

A multi-mode paging system and method of selectively paging an individual through one of a plurality of paging mechanisms. An indication of a paging mechanism for each individual to be paged is stored in a memory device. When an input is received from a user to page the individual, a control processor retrieves the indication of a paging mechanism for the individual to be paged and determines which of the plurality of paging mechanisms is to be utilized to page the individual. The individual may be selectively paged through an on-premises paging system, a wide area paging system, or a telephone such as a cellular telephone. An autodialer may be remotely located and connected by a wireless link to the processor, or the system may dial out using a wireless subscriber unit.

19 Claims, 7 Drawing Sheets

MULTI-MODE PAGING SYSTEM

CROSS-REFERENCE TO RELATED APPLICATIONS

This application is a continuation-in-part of co-pending U.S. patent application Ser. No. 09/451,368 entitled "Multi-Mode Paging System" filed Nov. 27, 1999 in the names of Russell P. Blink and Kenneth J. Lovegreen.

BACKGROUND OF THE INVENTION

1. Technical Field of the Invention

This invention relates to radio paging systems and, more particularly, to a multi-mode paging system that selectively pages an individual through one of a plurality of paging mechanisms.

2. Description of Related Art

Many business establishments today utilize on-premises radio paging systems to locate employees or notify customers when service is available. For example, hospitals may page for doctors, and restaurants may page customers to notify them when their table is ready. In the context of the restaurant usage, a customer is typically greeted by a hostess who informs the customer that there is a waiting period for a table, and provides the customer with an on-premises pager. The pager has a control number associated with it, and the hostess enters the control number, either manually or electronically, into a pager controller. When the customer's table is ready, the hostess inputs this information to the controller. The controller instructs a low power, on-premises transmitter to page the pager with the associated control number. The customer's pager then notifies the customer through an audio, visual, or vibratory indication that the table is ready.

There are several disadvantages with the existing on-premises paging system. First, if the customer wanders too far away from the on-premises transmitter, the pager may not receive the page. Thus, the customer may miss the indication that his table is ready if he has to go to his car in the parking lot. Second, restaurants have a major problem with loss and breakage of the on-premises pagers. Some customers steal the pagers while others inadvertently leave with them after deciding among themselves that they do not want to wait for a table. Other pagers are damaged when they are dropped or otherwise mistreated by waiting customers.

There are no known prior art teachings of a solution to the aforementioned deficiency and shortcoming such as that disclosed herein. In order to overcome the disadvantage of existing on-premises paging systems, it would be advantageous to have a multi-mode paging system that selectively pages an individual through one of a plurality of paging mechanisms. Such a system would decrease the restaurant's reliance on on-premises pagers, and would provide greater flexibility and roaming range to waiting customers. The present invention provides such a system.

SUMMARY OF THE INVENTION

In one aspect, the present invention is a multi-mode paging system that selectively pages an individual through one of a plurality of paging mechanisms. The system includes a first paging mechanism comprising an on-premises radio frequency (RF) transmitter for paging on-premises pagers, a second paging mechanism comprising means for dialing out a telephone call to wide area pagers or cellular telephones, and a control processor that selects an appropriate paging mechanism for each individual to be paged. The second paging mechanism includes an on-premises wireless relay transmitter for transmitting a wide area pager number or cellular telephone number to a wireless relay receiver that is connected to a means for dialing out a telephone call to the wide area pager or cellular telephone.

In another aspect, the present invention is directed to a multi-mode paging system that selectively pages an individual through an on-premises pager, a wide area pager, or a cellular telephone. When dialing out a telephone number for the wide area pager or cellular telephone, the system may include a wireless communication link from the control processor to a modem and autodialer located near a telephone interface. The telephone interface may be coupled to a telephone line or a facsimile line. Alternatively, the system may utilize a wireless subscriber unit to place a wireless call to the wide area pager or cellular telephone.

In another aspect, the present invention is directed to a method of selectively paging an individual through one of a plurality of paging mechanisms. The method begins by storing in a memory device, an indication of a paging mechanism for each individual to be paged. When an input is received from a user to page the individual, a control processor retrieves the indication of a paging mechanism for the individual to be paged and determines which of the plurality of paging mechanisms is to be utilized to page the individual. This is followed by paging the individual through an on-premises paging system upon determining that the on-premises paging system is to be utilized to page the individual; paging the individual through a wide area paging system upon determining that the wide area paging system is to be utilized to page the individual; or calling the individual on a telephone upon determining that the telephone is to be utilized to page the individual. If the telephone is utilized, a pre-recorded message may be played after the individual answers the telephone. The steps of paging the individual through a wide area paging system and calling the individual on a telephone may include relaying the wide area pager number or the telephone number from the processor to a telephone interface.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a multi-mode paging system and method. When installed in a premises such as a restaurant, the system enables the restaurant owner to page customers who are waiting for a table using either the customer's cellular telephone, their wide-area pager, or an on-premises pager supplied to the customer by the restaurant. If the customer has a cellular telephone or wide-area pager, a hostess enters either the customer's cellular telephone number or their wide-area pager number in a control computer and receives an identification number in response. If the customer does not have a cellular telephone or wide-area pager, an on-premises pager is provided. The control computer includes an RS232 interface for interfacing with other systems such as a seating management system, and a modem for dialing out to the customer's cellular telephone number or their wide-area pager telephone number.

Typically, a restaurant owner or hostess greets customers at a stand or lectern positioned near the front of the restaurant. Very often, the stand or lectern is not positioned near an available Public Switched Telephone Network (PSTN)/ Public Land Mobile Network (PLMN) interface such as a phone jack. In one embodiment of the present invention, as discussed in further detail below, the system of the present invention does not require a phone jack at the stand or lectern to page the customer's wide-area pager or cellular telephone. In this embodiment, a wireless relay transmitter located at or near the greeter's position transmits the number of the customer's wide-area pager or cellular telephone to a wireless relay receiver connected to a modem/Automatic Dialing Unit (ADU) connected to a PSTN/PLMN interface in another part of the restaurant. The wireless relay receiver, modem/ADU, and PSTN/PLMN interface may be located, for example, in an office in the back of the restaurant, and may utilize any existing phone line in the restaurant to call the customer's wide-area pager or cellular telephone number. Preferably, the system uses a secondary phone line such as a fax line so that the restaurant's primary telephone line is not occupied by calls being made to page customers. Alternatively, restaurants without a phone jack near the greeter's station may utilize a Wireless Subscriber Unit (WSU) to place wireless calls to the customer's wide-area pager or cellular telephone.

Figure 1:
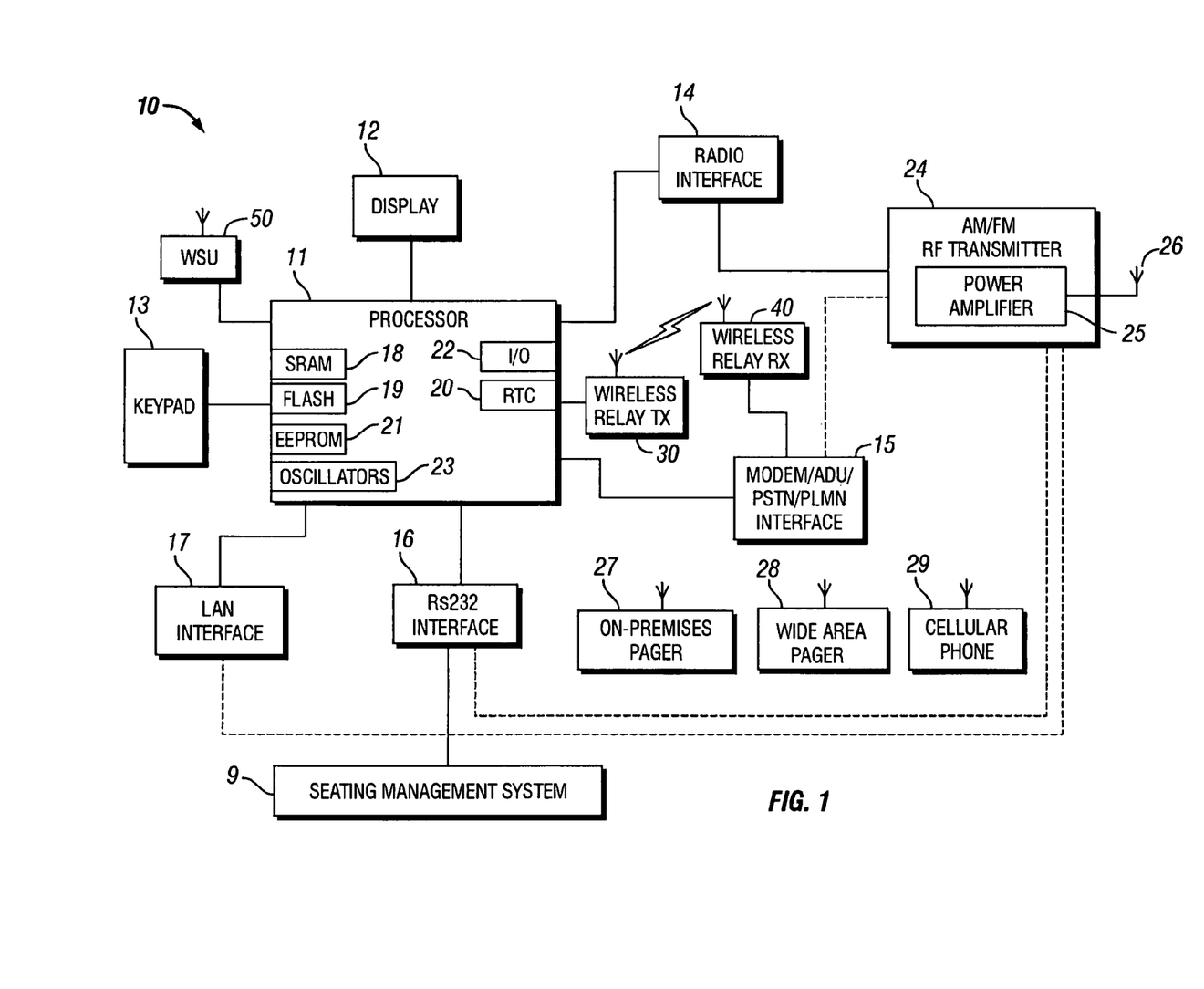
FIG. 1 is a simplified block diagram of the preferred embodiment of the system of the present invention.

FIG. 1 is a simplified block diagram of the preferred embodiment of the multi-mode paging system 10 of the present invention. The system is a processor-based paging unit in which a processor 11 is connected to a display 12 such as an LCD display, a keypad input device 13, a radio interface 14, an RS232 serial interface 16, a Local Area Network (LAN) interface 17, a wireless relay transmitter 30, and optionally, a Wireless Subscriber Unit (WSU) 50. The LCD display may be, for example, a 4 line by 16 character module. The keypad input device may be, for example, a 4-column by 5-row membrane switch. The radio interface 14 interfaces the processor with an on-premises RF transmitter (AM and narrow band FM) 24 utilized to page on-premises pagers 27. The RS232 serial interface 16 may be utilized to connect the processor to other systems such as a seating management system 9. The LAN interface 17 may be utilized as a backup or alternative pathway from the processor to the on-premises transmitter 24. The wireless relay transmitter 30 may be utilized to provide a wireless connection from the processor to a wireless relay receiver 40 and a modem/ADU/PSTN/PLMN interface 15 in restaurants that do not have a phone jack near the greeter's station. The restaurant may optionally utilize the WSU 50 to directly place wireless calls through the PLMN to customers' wide area pagers or cellular telephones. In this case, the wireless relay transmitter 30, wireless relay receiver 40, and modem/ADU/PSTN/PLMN interface 15 are not required.

The processor functional block 11 includes a Static Random Access Memory (SRAM) 18 for storing working variables and the protocol stack; a non-volatile re-writeable (FLASH) memory 19 for storing an executable program; a Real Time Clock (RTC) 20 for keeping the time of day; an EEPROM 21 for storing configuration data; Input/Output (I/O) resources 22 to interface to the display 12, keypad 13, raido interface 14, and wireless relay transmitter 30; and oscillators 23 for both the RTC 20 and the processor.

The radio interface 14 may be a wired or wireless interface which, in the preferred embodiment, connects the processor 11 to the on-premises paging transmitter 24. Alternatively, the processor may be remotely located from the premises and the transmitter, and may be connected to the transmitter 24 via the wireless relay transmitter 30, the wireless relay receiver 40, and the modem 15; by the RS232 interface 16, or by the LAN interface 17. In this configuration, ID numbers for on-premises pagers, and telephone numbers for wide area pagers and cellular telephones may be entered at the premises and remotely communicated to the control processor. Additionally, tasks such as changing the system setup or operating mode can be performed remotely.

The on-premises paging transmitter implements a RF source and a modulator capable of AM and FM operation along with a power amplifier 25 to drive an antenna 26. As described below, the processor controls the multi-mode paging system to selectively page individual customers utilizing (1) the on-premises paging transmitter 24 and an on-premises pager 27, (2) the modem/ADU/PSTN/PLMN interface 15 and a wide area pager 28, or (3) the modem/ ADU/PSTN/PLMN interface and a cellular telephone 29. In this configuration, the wireless relay transmitter 30 and receiver 40 implement a RF source and modulator capable of AM and FM operation.

Figure 2:
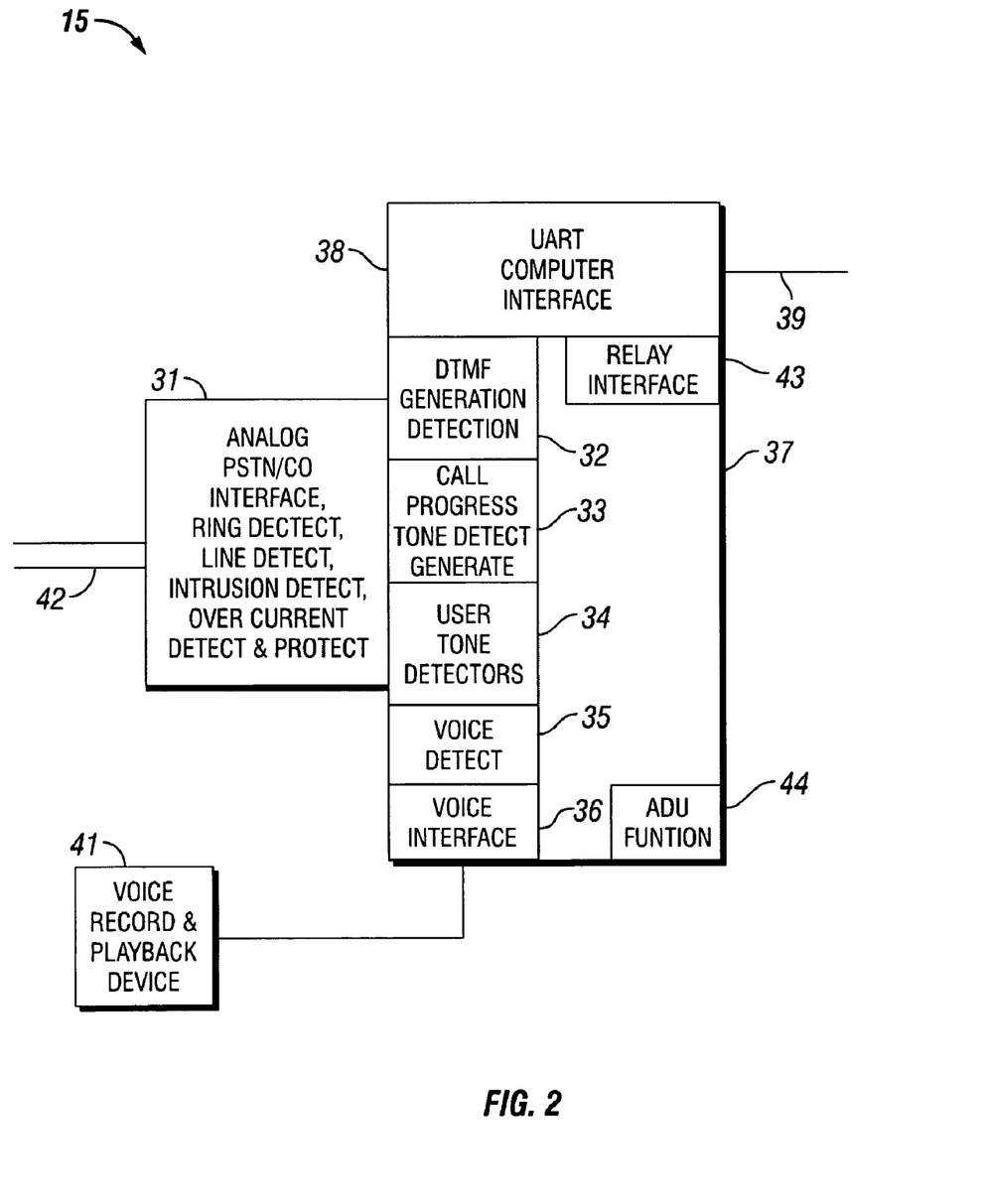
FIG. 2 is a functional block diagram of a modem and interfaces in the preferred embodiment of the system of the present invention.

FIG. 2 is a functional block diagram of the modem/ADU/ PSTN/PLMN interface 15 in the preferred embodiment of the system of the present invention. The modem/ADU/ PSTN/PLMN interface includes an analog PSTN/Central Office (CO) termination 31, a Dual Tone Multiple Frequency (DTMF) detector and generator 32, a Call Progress tone detector and generator 33, general purpose user tone detector(s) and generator(s) 34, a voice detector 35, a voice interface 36, a modem 37 with High Level Data Link Control (HDLC) coder/decoder (CODEC), and a relay interface 43 which interfaces with the wireless relay receiver 40. Alternatively a Universal Asynchronous Receiver-Transmitter (UART) computer interface 38 is employed which utilizes a serial processor interface 39 to interface with the processor 11. In this case, the wireless relay receiver 40 receives the customer telephone number from the wireless relay transmitter, and reformats the data for acceptance by the UART. Preferably, the modem/ADU/PSTN/PLMN interface has autodialing unit functionality 44 so that the PLMN interface unit can place a telephone call on behalf of another device such as the processor. Preferably, the modem/ADU/ PSTN/PLMN interface is equipped with automatic redial enabling the interface to detect a busy signal and redial the call until a connection is obtained.

The modem/ADU/PSTN/PLMN interface may also connect to a voice recording and playback device 41. The voice recording and playback device stores and plays back on demand, one of a plurality of pre-recorded announcements utilized when the system pages a customer by calling their cellular telephone. The wireless relay transmitter 30 may send an announcement number along with the telephone number. The announcement number may be randomly selected or may be selected by the restaurant manager. The announcement may include a query for the customer, or it may instruct the customer to confirm that the message has been received, and that the customer is proceeding to the hostess station. For example, the customer may press the number "1" if they are proceeding to the hostess station, or may press the number "2" if they no longer desire the table. The modem/ADU/PSTN/PLMN interface recognizes the DTMF tone and informs the processor of the result.

The PSTN/CO termination 31 connects to a phone line 42 and provides proper loop current control as well as over-current protection, intrusion detection when another party tries to seize the same line, single and bi-phase ring detection, forward and reverse loop current detection and surge protection. The phone line 42 may be a primary telephone line or a secondary telephone line such as a facsimile line. The DTMF detectors and generators 32 implement a full matrix of sixteen tone pairs with correct twist and cadence detection for automatic dialing. The call progress tone detector 33 implements standard as well as user-definable detection protocols. The modem 37 implements all standard signal protocols, BELL and ISO, from 300 to 2400 baud.

Figure 3A:
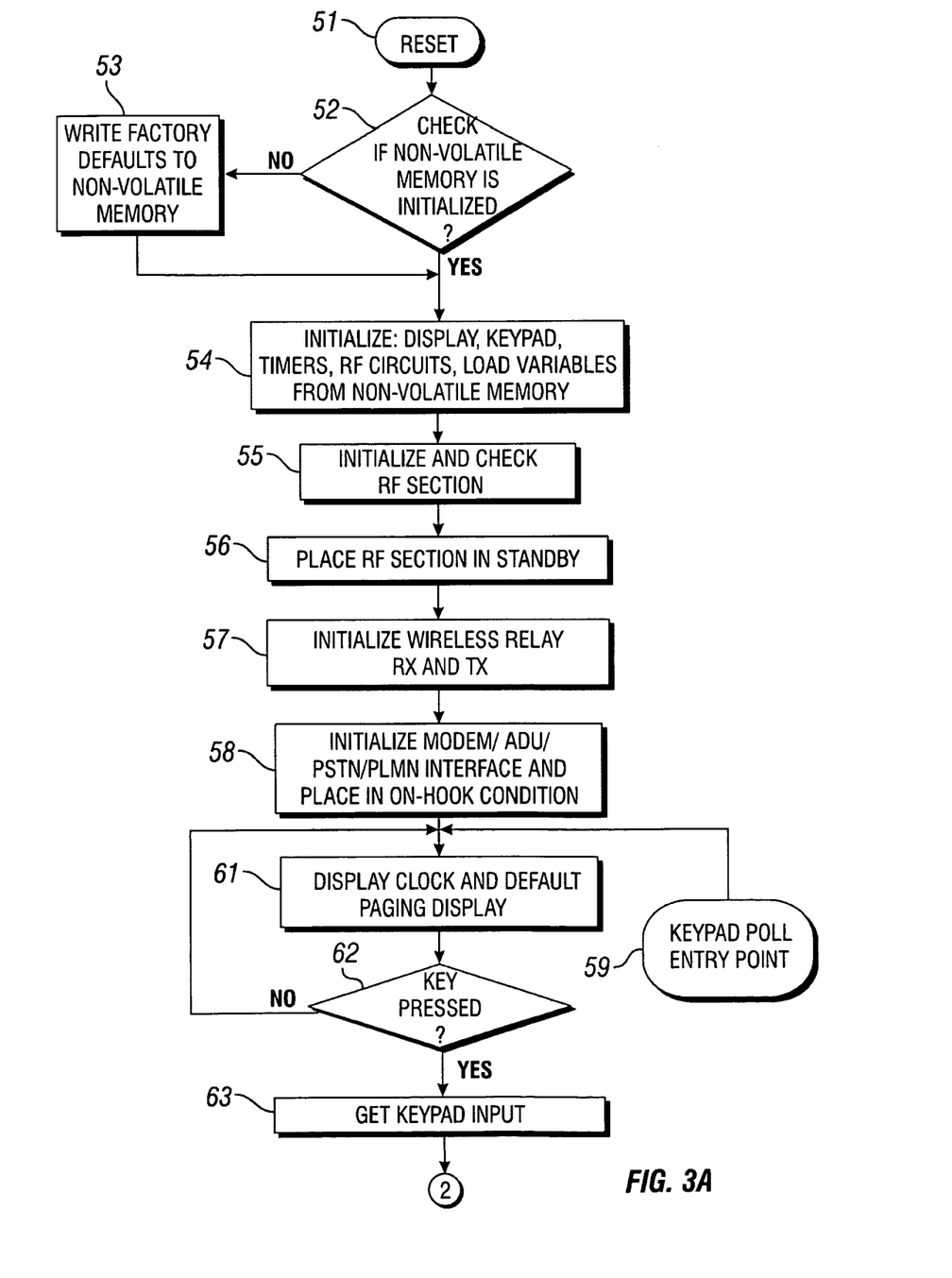
FIGS. 3A and 3B are a flow chart illustrating the steps of a main process performed in the method of the present invention.
Figure 3B:
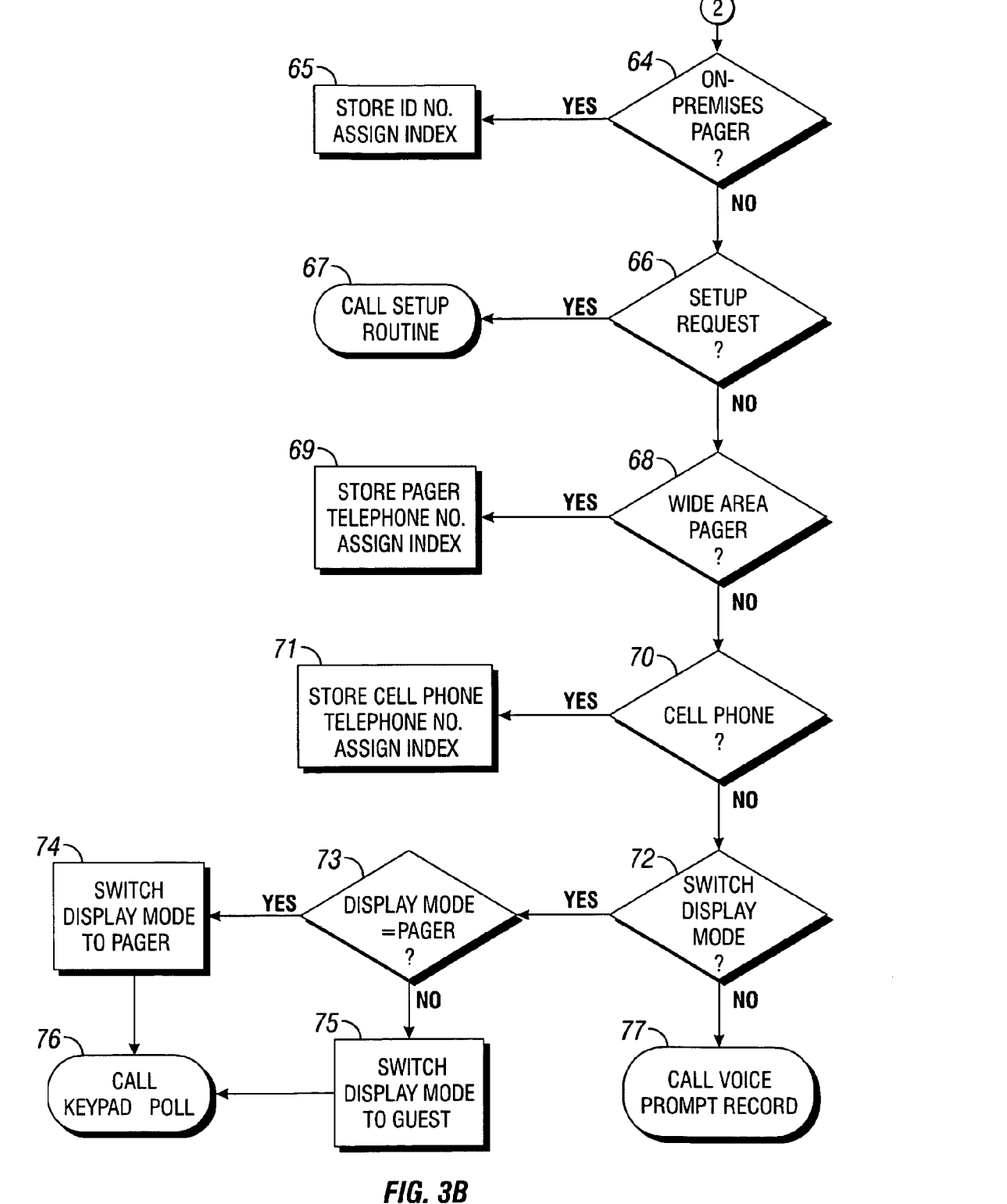

FIGS. 3A and 3B are a flow chart illustrating the steps of a main process performed in the method of the present invention. From a powered off state to a powered on state, or after a reset at step 51, the system executes an initialization procedure to ensure proper operation. First the processor timers, I/O interfaces and interrupts are correctly initialized followed by the display and keypad. At step 52, the non-volatile memory is checked for previous initialization, and if none is detected, the process moves to step 53 where factory default settings residing in the program memory 21 are written to the non-volatile memory 19. If the non-volatile memory is initialized, or factory default settings are loaded, the process moves to step 54 where the operating variables are loaded from the non-volatile memory, and any other initialized data is properly set to default values. Following these operations, the RF section is initialized and checked for proper operation at 55 and then placed in a stand-by mode at 56. At step 57, the wireless relay transmitter and receiver are initialized and checked for proper operation and then placed in stand by mode. At step 58, the PSTN interface is initialized, and then placed in an ON-HOOK condition monitoring the presence of a phone line.

The system then performs several steps to implement a user interface with the LCD display 12 and the keypad input device 13. After system initialization from a powered off state, the display indicates a prompt at step 59 for the user to make an entry on the keypad. At step 61, the display then displays the clock setting and a default paging mode. At 62, it is determined whether or not the user presses a selection key. If not, the process indicates another prompt for the user to make an entry. If a key is pressed, the process moves to step 63 and gets the keypad input.

The keypad indicates the following functions:

| Keys | Function |
| --- | --- |
| 0–9 | Numeric entry |
| SETUP | Enters the user programming mode |
| CELL | Used to designate a cell phone page |

-continued

| Keys | Function |
| --- | --- |
| PGR | Used to designate an on-premises page |
| WAP | Used to designate a wide area page |
| STAFF | Switches to staff paging mode |
| CLEAR | Erases current data being entered |
| ENTER | Accepts data being entered |
| F1–F4 | Special function keys |

The special function keys can be used in two ways, first their function is modal depending on the state of the transmitter and what function is being implemented and second, the display indicates on the last row above each key what function the key represents.

The process then moves to FIG. 3B, step 64 where it is determined whether the user requested an on-premises page. If so, the process moves to step 65 where a pager identification number for an on-premises pager is entered and stored. The control processor then assigns an index number for the on-premises pager. Later, when the user enters the assigned index number, the paging algorithm (FIG. 4) is utilized to call the on-premises pager. If the user did not request an on-premises page at 64, the process moves to step 66 where it is determined whether the user requested that system setup be performed. If so, the process moves to step 67 where a setup routine is performed. If the user did not request system setup at 66, the process moves to step 68 where it is determined whether the user requested to enter a wide area pager telephone number. If so, the process moves to step 69 where the telephone number is entered and an index number is assigned. Later, when the user enters the assigned index number, the paging algorithm is called and utilized to call the wide area paging telephone number supplied.

If the user did not request a wide area page at 68, the process moves to step 70 where it is determined whether the user requested to enter a cellular telephone number. If so, the process moves to step 71 where the telephone number is entered and an index number is assigned. Later, when the user enters the index number, the paging algorithm is called and utilized to call the cellular telephone number supplied.

The index numbers may be set up many ways. For example, blocks of numbers may be allocated for on-premises pagers, wide area pagers, and cellular telephones. In an exemplary scenario, the index numbers are allocated as follows:

| Index Number | Allocation |
| --- | --- |
| 1–250 | On-Premises Pagers |
| 251–500 | Wide Area Pagers |
| 501–750 | Cellular Telephones |
| 751–999 | Future Use |

If the user did not request to call a cellular telephone at 70, the process moves to step 72 where it is determined whether the user has switched the display mode. If so, the process moves to step 73 where it is determined whether the user requested to switch the display mode to PAGER. If so, the process moves to step 74 and switches the display mode to PAGER. If not, the process moves to step 75 and switches the display mode to GUEST. The keypad then returns to the keypad poll state at 76 awaiting further user entries. If the user did not switch the display mode at step 72, the process moves to step 77 where a voice prompt recording routine (FIG. 6) is performed.

Figure 4:
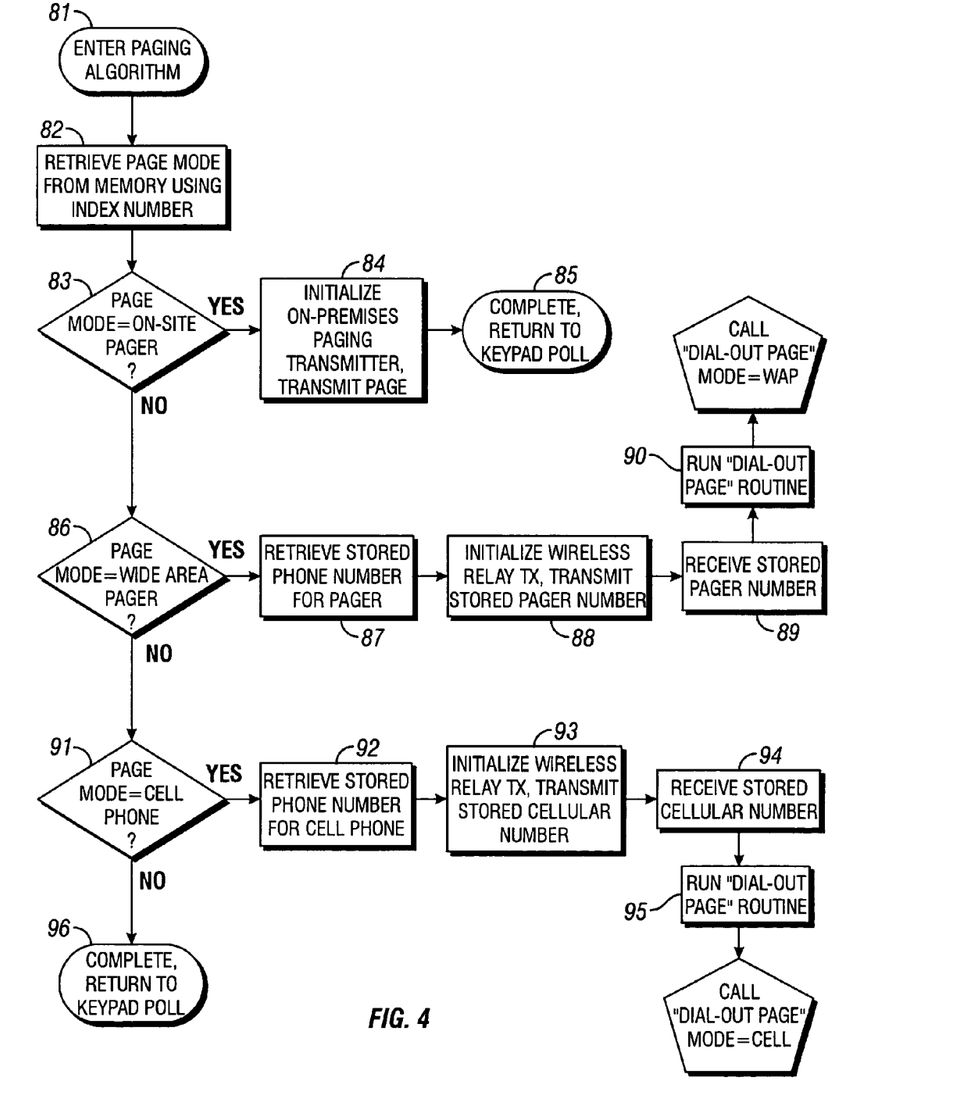
FIG. 4 is a flow chart illustrating the steps of a process performed by a paging algorithm in the method of the present invention.

FIG. 4 is a flow chart illustrating the steps performed by the paging algorithm in the method of the present invention. The paging algorithm is entered at step 81 when the user enters an index number. At step 82, a Page Mode is retrieved from memory using the index number entered by the user. For example, if the user enters an index number in the range 1–250, the retrieved Page Mode indicates an on-premises pager; if the user enters an index number in the range 251–500, the retrieved Page Mode indicates a wide area pager; if the user enters an index number in the range 501–750, the retrieved Page Mode indicates a cellular telephone.

At step 83, it is determined whether the Page Mode indicates an on-premises pager. If so, the process moves to step 84 where the on-premises RF transmitter 24 is initialized, and the on-premises page is transmitted. The process is then complete, and the keypad then returns to the keypad poll state at 85. If the Page Mode did not indicate an on-premises pager at 83, the process moves to step 86 where it is determined whether the Page Mode indicates a wide area pager. If so, the process moves to step 87 where the stored telephone number for the wide area pager is retrieved from memory. At step 88, the wireless relay transmitter is initialized and the stored telephone number for the wide area pager is transmitted. The stored telephone number for the wide area pager is received by the wireless relay receiver at step 89. The dial-out page routine (FIG. 5) is performed at step 90 utilizing dial-out page mode Wide Area Page (WAP).

If the Page Mode did not indicate a wide area pager at 86, the process moves to step 91 where it is determined whether the Page Mode indicates a cellular telephone. If so, the process moves to step 92 where the stored telephone number for the cellular telephone is retrieved from memory. At step 93, the wireless relay transmitter is initialized and the stored telephone number for the cellular phone is transmitted. The stored telephone number for the cellular phone is received by the wireless relay receiver at step 94. The dial-out page routine (FIG. 5) is performed at step 95 utilizing dial-out page mode PHONE. If the Page Mode did not indicate a cellular telephone at 91, the process moves to step 96 where the keypad then returns to the keypad poll state.

Figure 5:
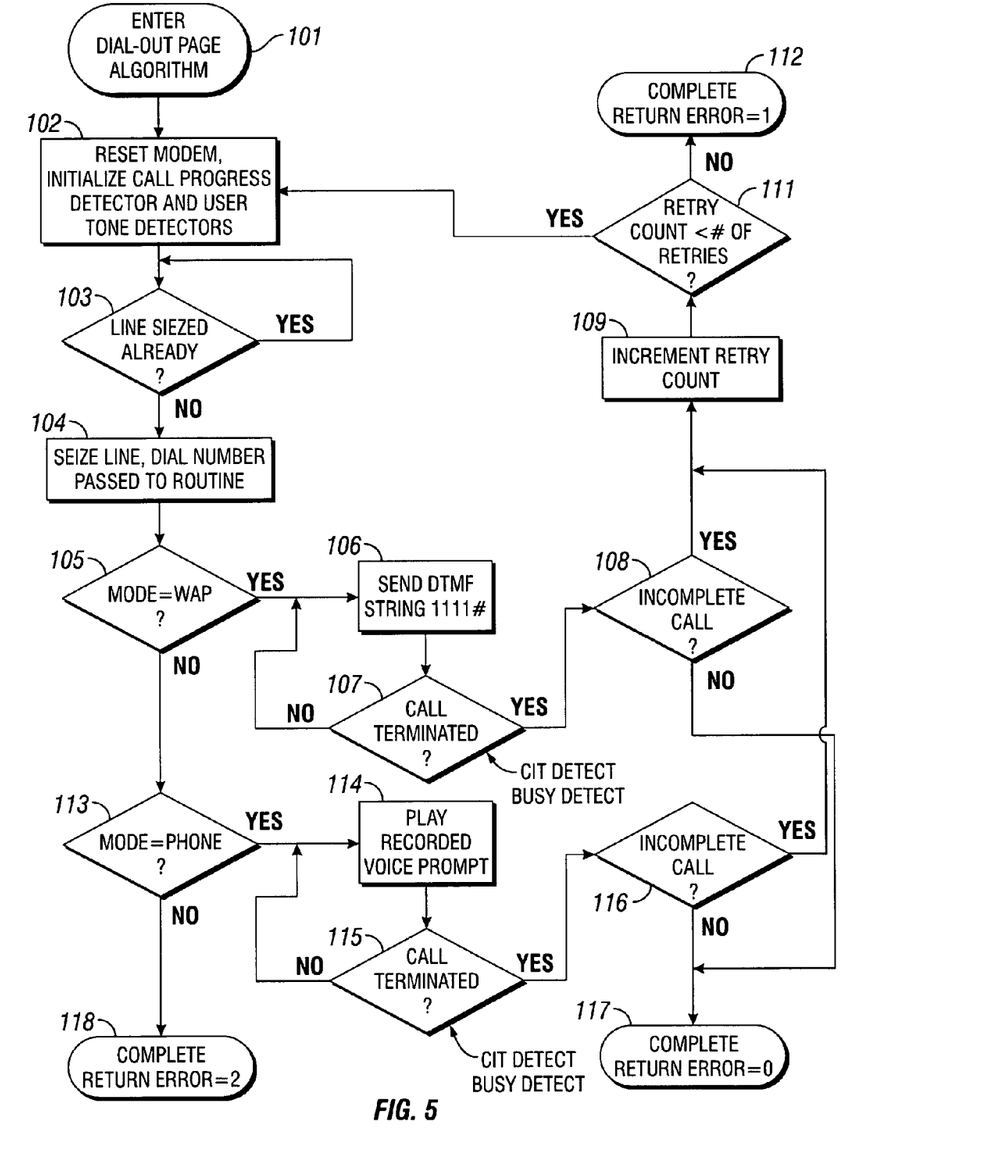
FIG. 5 is a flow chart illustrating the steps of a dial-out page routine performed in the method of the present invention.

FIG. 5 is a flow chart illustrating the steps of the dial-out page routine performed in the method of the present invention. The dial-out page routine is entered at step 101, and at step 102, the modem is reset, and the call progress tone detector 33 and the user tone detectors 34 are initialized. At step 103, it is determined whether or not a telephone line is already seized. If so, the process waits for a line to become available. If not, the process moves to step 104 and seizes a line and passes the telephone number to be dialed to the routine.

At step 105, it is determined whether the Page Mode is Wide Area Page (WAP). If so, the process moves to step 106 where the DTMF tones for the string 1111# is sent. At step 107, CIT Detect and Busy Detect are performed to determine whether the call has been terminated. If not, the process returns to step 106 and continues to send the DTMF string 1111#. If the call has been terminated, the process moves to step 108 where it is determined whether or not the call is an incomplete call. If the call is incomplete, the process moves to step 109 where a retry counter is incremented. At step 111, it is determined whether or not the retry count is less than an allowed number of retries. If so, the process returns to step 102 and attempts the process again. If the retry count equals the allowed number of retries, the process is halted, and an error code=1 is returned at 112.

If it is determined at step 105 that the Page Mode is not WAP, the process moves to step 113 where it is determined whether the Page Mode is PHONE. If so, a pre-recorded announcement is sent at step 114. The pre-recorded announcement may be a voice announcement that, for example, welcomes the customer to the restaurant and informs them that their table is ready. Alternatively, the announcement may be a text message that is sent to the customer's digital cellular telephone where the message is displayed. The system may store several pre-recorded messages, and may select a message at random, or may play a message designated by the restaurant manager.

At step 115, CIT Detect and Busy Detect are performed to determine whether the call has been terminated. If not, the process returns to step 114 and continues to play the pre-recorded announcement. The announcement may repeat the pre-recorded message for a predefined time period such as 30 seconds. If the call has been terminated, the process moves to step 116 where it is determined whether or not the call is an incomplete call. If the call is incomplete, the process moves to step 109 where a retry counter is incremented. At step 111, it is determined whether or not the retry count is less than an allowed number of retries. If so, the process returns to step 102 and attempts the process again. If the retry count equals the allowed number of retries, the process is halted, and an error code=0 is returned at 117. If the Page Mode did not indicate PHONE at 113, the process moves to step 118 where an error code=2 is returned.

One of the first functions a user needs to do is record the voice prompts used when paging cellular telephones. This may be accomplished by connecting the transmitter to a standard analog telephone line using either of the two RJ11 connectors provided, and then connecting a local telephone handset to the second connector. The user then takes the handset off the hook, waits for the dial-tone, and then dials any digit other than "0" to break the central office (CO) dial-tone. The user now presses and holds a Function (F) key to select the type of voice prompt to be recorded. For example, the user may press "F1" to record a guest prompt, "F2" to record a server prompt, or "F3" to record a manager prompt, with "F4" being reserved for other types of voice prompts.

The transmitter then begins recording the prompt using the telephone handset microphone. When the F-key is released, the prompt is played back through the handset for user verification. The user can then hang-up the phone. Generally, the CO allows up to 10 seconds of silence after breaking the dial-tone, thus allowing ample time to record the voice prompt.

Alternatively, the voice prompt may be recorded using the setup feature. A menu is selected which places the telephone interface into a state waiting for the line to ring. Once a ring is detected, the interface seizes the line and plays a tone indicating that the user should begin recording the new voice prompt. Once the user stops speaking for one second, the interface signals the processor to stop recording.

Figure 6:
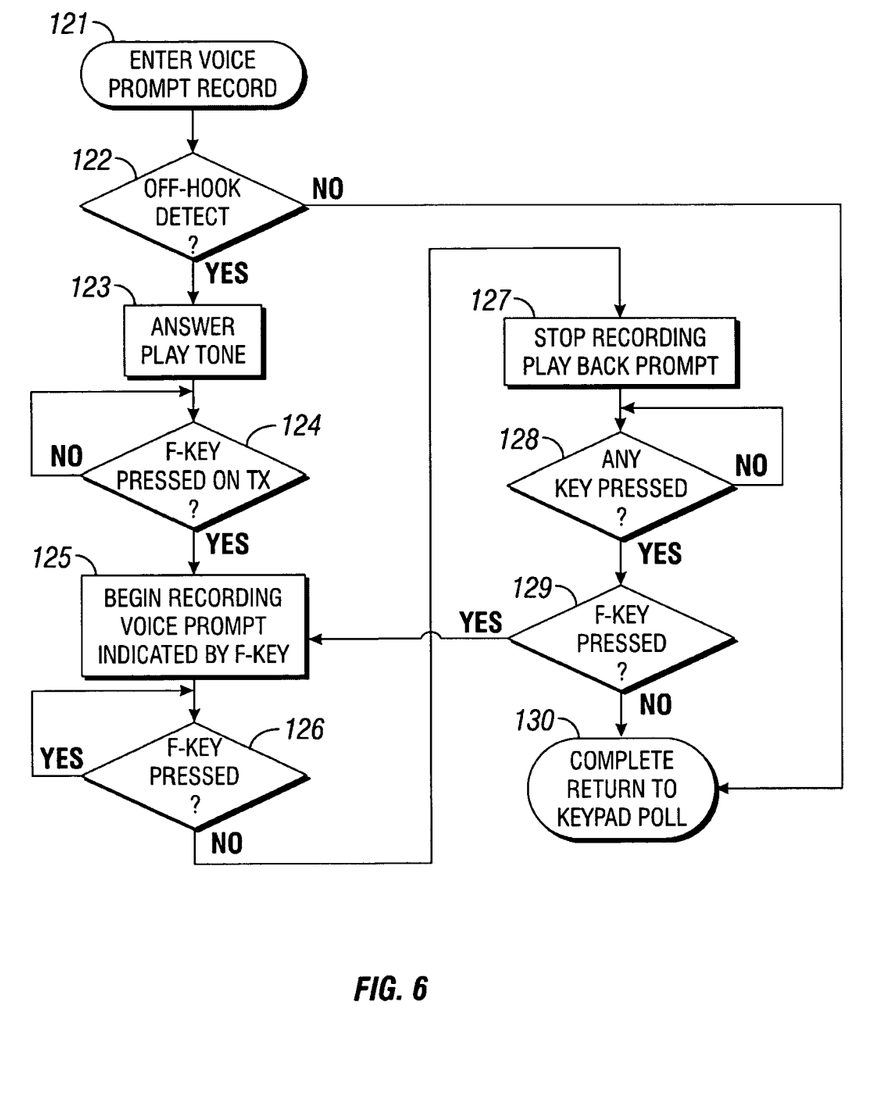
FIG. 6 is a flow chart illustrating the steps of a voice-prompt recording routine performed in the method of the present invention.

A more detailed look at the voice-prompt recording routine is shown in FIG. 6. The voice-prompt recording routine is entered at step 121, and at step 122, an off-hook detection is performed. The user may, for example, pick up the local handset and press "1" or any other digit other than "0" on the phone to break the dial-tone with the central office. If an off-hook condition is not detected, the process moves to step 130 where the process is complete, and the keypad returns to the keypad poll state. If an off-hook condition is detected at 122, the process moves to step 123 where the user answers and a tone is played. At 124, it is determined whether an F-key is pressed on the transmitter. If not, the process waits for an F-key to be pressed. When an F-key is pressed and held, the transmitter begins recording the type of voice prompt indicated by the F-key using the telephone handset microphone. As shown at step 126, the transmitter will continue to record until the F-key is released. The process then moves to step 127 where the recording is stopped, and the prompt is played back through the handset for user verification. At step 128, it is determined whether any key is pressed. If not, the process waits for a key to be pressed. If a key is pressed, the process moves to step 129 where it is determined whether an F-key has been pressed again. If so, the process returns to step 125 and begins recording the type of voice prompt indicated by the F-key. If an F-key is not pressed at 129, the process moves to step 130 where the process is complete, and the keypad returns to the keypad poll state. The user can then hang up the local handset at any time.

System Operation

The system is capable of distinguishing between guest pagers and staff pagers. Pagers for guests and for staff personnel can include on-premises paging devices, commercial wide area pagers, and cellular telephones. For wide area pagers and cellular telephones, the system dials out an appropriate telephone number to effect the page.

In the scenario of a restaurant, where guests are waiting for tables, the hostess (user) greets guests at a stand or lectern and determines from the guest whether the guest has a wide area pager or a cellular telephone that can be used to notify the guest that a table is ready. If the guest chooses not to use his/her wide area pager or cellular telephone, or does not have one, the hostess provides the guest with an on-premises pager. The hostess then indicates to the system which type of paging device will be utilized, and, utilizing the keypad 13 or display screen 12, enters either an ID number for an on-premises pager, or the appropriate telephone number for the guest's wide area pager or cellular telephone along with any required PIN. The control processor then provides the hostess with an index number to refer back the particular guest when sending a page.

In this scenario, it is presumed that a guest arrives with a cellular telephone. The hostess presses the CELL key and enters the telephone number in the system. The system issues, for example, the index number 501. Alternatively, the next guest may have a wide area pager. When the hostess presses the WAP key and enters the wide area pager telephone number, the index number 251 may be issued. A third guest may then arrive and not have a pager or a cellular telephone. The hostess then provides the guest with an on-premises pager, presses the PGR key, and enters an ID number for the on-premises pager. The system may then issue the index number 1.

To page a guest, the hostess enters the index number of the on-premises pager, wide area pager, or cellular telephone, followed by the enter key. If the paging device is an on-premises pager, the on-premises transmitter takes the RF section out of stand-by and transmits the local page. The RF section is placed back into stand-by when complete. Wide area pagers or cellular telephones are paged by the processor using the telephone number previously entered by the hostess. If the optional WSU 50 is utilized, the WSU autodials the telephone number and places a wireless call to the customer's wide area pager 28 or cellular telephone 29. If the WSU is not present, the wireless relay transmitter 30 transmits the wide area pager number or cellular telephone number to the wireless relay receiver 40 connected to the modem/ADU/PSTN/PLMN interface 15 positioned in another part of the restaurant. The PLMN interface preferably seizes a secondary telephone line such as a fax line, and autodials the stored telephone number. This is followed by an alpha-numeric prompt in the case of pagers or a selected voice or text message for cellular telephones. If the call is improperly terminated or busy, CIT tones are detected, or an early disconnect occurs, the transmitter makes additional attempts to complete the call.

Thus, for restaurants in which the greeter's station does not have a nearby phone jack, the present invention either calls the customer through a WSU 50, or sends the customer's telephone number by wireless link to the modem/ADU/PSTN/PLMN interface 15 located near a phone jack. By using a secondary phone line such as a fax line to complete the page, the present invention does not tie up the restaurant's primary phone line.

Although the preferred embodiment of the present invention has been described herein in terms of an on-premises restaurant paging system, it should be recognized that the invention may be utilized for other purposes in which a service or product supplier needs to contact a customer. For example, the invention could be implemented in an automobile repair shop. When a customer's car is ready, and the customer is waiting at the shop, the system may page the customer utilizing an on-premises pager, the customer's wide area pager, or the customer's cellular telephone. If the customer is waiting elsewhere, the system may page the customer through the customer's wide area pager, cellular telephone, or landline phone at the customer's home or office.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A multi-mode paging system that selectively pages an individual through either an on-premises pager that operates only with an on-premises paging system or through a wide area pager that operates only with a wide area paging system, said system comprising:

a control processor that selects whether to page the individual through the on-premises pager or the wide area pager;

an on-premises radio frequency (RF) transmitter connected to the processor that pages the on-premises pager when instructed by the processor; and means connected to the processor for dialing out a telephone number of the wide area pager for paging the on-premises individual through the wide area paging system when instructed by the processor, wherein the means for dialing out is connected to the processor with a wireless link, said wireless link transmitting the telephone number from the processor to the means for dialing out, said wireless link including:

a wireless relay transmitter connected to the processor; and a wireless relay receiver connected to the means for dialing out.

2. The multi-mode paging system of claim 1 wherein the means for dialing out a telephone number includes means for sending a pre-recorded alpha-numeric message to the wide area pager.

3. The multi-mode paging system of claim 1 wherein the means for dialing out is coupled to a facsimile line.

4. The multi-mode paging system of claim 1 wherein the means for dialing out a telephone number is a wireless subscriber unit (WSU) that places a wireless telephone call to the wide area pager through the Public Land Mobile Network (PLMN) and the wide area paging system.

5. A multi-mode paging system that selectively pages an on-premises individual through either an on-premises pager that operates only with an on-premises paging system or through a cellular telephone, said system comprising:
   a control processor that selects whether to page the individual through the on-premises pager or the cellular telephone;
   an on-premises radio frequency (RF) transmitter connected to the processor that pages the on-premises pager when instructed by the processor; and
   means connected to the processor for dialing out a telephone number of the cellular telephone when instructed by the processor, wherein the means for dialing out a telephone number is connected to the processor with a wireless link, said wireless link transmitting the telephone number from the processor to the means for dialing out, said wireless link including:
   a wireless relay transmitter connected to the processor; and
   a wireless relay receiver connected to the means for dialing out.

6. The multi-mode paging system of claim 5 wherein the means for dialing out a telephone number includes means for sending a pre-recorded announcement to the cellular telephone.

7. The multi-mode paging system of claim 6 wherein the means for sending a pre-recorded announcement includes means for sending a pre-recorded voice announcement to the cellular telephone.

8. The multi-mode paging system of claim 6 wherein the means for sending a pre-recorded announcement includes means for sending a pre-recorded text announcement to the cellular telephone.

9. The multi-mode paging system of claim 6 further comprising means for receiving a response signal sent from the cellular telephone in response to the announcement.

10. The multi-mode paging system of claim 5 wherein the means for dialing out is coupled to a facsimile line.

11. The multi-mode paging system of claim 5 wherein the means for dialing out a telephone number is a wireless subscriber unit (WSU) that places a wireless telephone call to the cellular telephone through the Public Land Mobile Network (PLMN).

12. A multi-mode paging system that selectively pages an individual through an on-premises pager that operates only with an on-premises paging system, through a wide area pager that operates only with a wide area paging system, or through a cellular telephone, said system comprising:
   a control processor that selects whether to page the individual on the on-premises pager, the wide area pager, or the cellular telephone;
   an on-premises radio frequency (RF) transmitter connected to the processor that pages the on-premises pager when instructed by the processor; and
   means connected to the processor for selectively dialing out a telephone number of the wide area pager or the cellular telephone when instructed by the processor, wherein the means for dialing out a telephone number is connected to the processor with a wireless link, said wireless link transmitting the telephone number from the processor to the means for dialing out, said wireless link including:
   a wireless relay transmitter connected to the processor; and
   a wireless relay receiver connected to the means for dialing out.

13. The multi-mode paging system of claim 12 wherein the means for selectively dialing out a telephone number is a wireless subscriber unit (WSU) that places a wireless call to the wide area pager through the wide area paging system, or to the cellular telephone through the Public Land Mobile Network (PLMN).

14. A method of selectively paging an individual through one of a plurality of paging mechanisms, said method comprising the steps of:
   storing in a memory device, an indication of a paging mechanism for each individual to be paged;
   receiving an input from a user to page the individual;
   retrieving, by a control processor, the indication of a paging mechanism for the individual to be paged;
   determining by the control processor, which of the plurality of paging mechanisms is to be utilized to page the individual;
   paging the individual through an on-premises paging system upon determining that the on-premises paging system is to be utilized to page the individual;
   relaying a wide area pager number to a telephone interface and paging the individual through a wide area paging system upon determining that the wide area paging system is to be utilized to page the individual; and
   relaying a telephone number to a telephone interface and calling the individual on a telephone upon determining that the telephone is to be utilized to page the individual.

15. The method of selectively paging an individual of claim 14 wherein the step of calling the individual on a telephone includes playing a pre-recorded announcement to the individual when the individual answers the telephone.

16. The method of selectively paging an individual of claim 15 further comprising the steps of:
   pre-recording a plurality of announcements; and
   selecting one of the pre-recorded announcements to play to the individual when the individual answers the telephone.

17. The method of selectively paging an individual of claim 16 wherein the step of selecting one of the pre-recorded announcements includes relaying an announcement number to the telephone interface.

18. The method of selectively paging an individual of claim 17 further comprising receiving a response signal sent from the telephone in response to the announcement.

19. The method of selectively paging an individual of claim 14 further comprising, before the steps of relaying a wide area pager number and relaying a cellular telephone number to a telephone interface, the step of establishing a wireless communication link between the processor and the telephone interface.

* * * * *